United States Patent
Wahlqvist et al.

[11] Patent Number: 6,088,398
[45] Date of Patent: Jul. 11, 2000

[54] ORTHOGONAL FREQUENCY DIVISION MULTIPLEX SYSTEMS

[75] Inventors: Mattias Wahlqvist; Roger Larsson; Christer Ostberg, all of Lulea, Sweden

[73] Assignee: Telia Research AB, Haninge, Sweden

[21] Appl. No.: 08/877,160

[22] Filed: Jun. 17, 1997

[30] Foreign Application Priority Data

Jun. 18, 1996 [SE] Sweden .................................. 9602402

[51] Int. Cl.$^7$ .............................. H04L 5/26; H04L 25/08; H04L 27/26
[52] U.S. Cl. ......................... 375/260; 375/348; 370/210; 370/206
[58] Field of Search .................................. 370/210, 206, 370/208; 375/348

[56] References Cited

U.S. PATENT DOCUMENTS

| | | | |
|---|---|---|---|
| 5,128,964 | 7/1992 | Mallory | 375/261 |
| 5,295,138 | 3/1994 | Greenberg | 370/344 |
| 5,311,550 | 5/1994 | Fouche | 375/260 |
| 5,416,767 | 5/1995 | Koppelear | 370/210 |
| 5,548,582 | 8/1996 | Brajal | 370/206 |
| 5,790,516 | 8/1998 | Gudmundson | 370/210 |

OTHER PUBLICATIONS

B. Engström, WW3–BAI/020/94, pp. 1–5, "A Class of OFDM Pulse Shapes," Nov. 10, 1994.
M. Gudmundson, et al., WW3/BAI/ERA–002, pp. 1–16, "First Results on Transmission Studies," Sep. 29, 1994.
M. Gudmundson, WW3–BAI/047/95, pp. 1–9, "RF Considerations of OFDM Signals," Mar. 23, 1995.
M. Gudmundson, WW3–BAI/047/95, pp. 1–9, "RF Considerations on OFDM Signal Transmissions," Apr. 3, 1995.
P. Willars, WW3/BAI–049/95, pp. 1–15, "A Comparison of Multiple Access Concepts," Mar. 23, 1995.

Primary Examiner—Stephen Chin
Assistant Examiner—Paul N Rupert
Attorney, Agent, or Firm—Oblon, Spivak, McClelland, Maier & Neustadt, P.C.

[57] ABSTRACT

A method and apparatus increase a maximum available bit rate on a single data link, in order to gain capacity within single cells. An orthogonal frequency division multiplex signal is filtered by a pulse shaping operation so as to suppress side lobes of the signal. This pulse shaping introduces known inter symbol interference (ISI) and loses orthogonality between subcarriers. However, a receiver utilizes the idea of overcoming ISI by applying equalization to the signal such that the loss of orthogonality is overcome.

31 Claims, 3 Drawing Sheets

SUBCARRIER NUMBER

THEORETICAL PERFORMANCE COMPARISON

ORTHOGONAL FREQUENCY DIVISION MULTIPLEX SYSTEMS

BACKGROUND OF THE INVENTION

1. Field of the Invention

The present invention relates to an orthogonal frequency division multiplex (OFDM) system, employing pulse shaping and having an enhanced available bit rate, and a method of increasing the available bit rate in a pulse shaped orthogonal frequency division multiplex system.

2. Discussion of the Background

One of the key issues when designing a third generation multiple access system is the need to support high bit rates, see for example P. Willars, "Key Issues for a $3^{rd}$ Generation Multiple Access Concept". In a multiple access system based on OFDM, the signal has to be pulse shaped in order to suppress the side lobes and reduce the size of the neighboring guard bands. Unfortunately, pulse shaping breaks orthogonality on every other sub-carrier and reduces the available bit rate (on a link level) by a factor two. The present invention enables recovery of the lost orthogonality, thus making it possible to transmit data with the full bit rate and suppressed side lobes. This results in only a slight loss in performance.

Where there is a demand for high bit rates, this will reduce system capacity (in terms of the number of users per cell). If the system capacity is to be increased there will be a need for increased in infrastructure investment, see C. Ostberg, "Coupling Losses, Coverage Range and Spectrum Mask Requirements". Therefore, it is very important for OFDM systems to support high maximum and highly variable bit rates in a single cell. In comparison with other transmission technologies, OFDM systems demonstrate that they can support the highest bit rates, see for example, P Willars, "A Comparison of Multiple Access Concepts".

SUMMARY OF THE INVENTION

The present invention is a system and method for increasing the maximum available bit rate on a single data link, in order to gain capacity within single cells. The method uses the fact that the pulse shaping introduces known inter symbol interference (ISI) and utilizes the idea of overcoming ISI by equalization.

According to a first aspect of the present invention, there is provided an OFDM system, including a transmitter and a receiver, in which side lobes are suppressed by pulse shaping, characterized in that loss of carrier orthogonality induced by pulse shaping is compensated by an equalizer located in the receiver.

The equalizer may be a predictive equalizer.

The equalizer may be a maximum likelihood sequence estimator equalizer.

An estimated data sequence $X_{est,k}$ may be selected such that metrics $(Z_k - (X_{est,k} \otimes W_k))^2$ are minimized.

The metrics may be calculated by means of a Viterbi algorithm, in a Viterbi decoder.

A total of $N \cdot M^{K-1}$ metrics may be calculated, where $X_k$ belongs to a M symbol alphabet, said OFDM system transmits N sub-carriers and the filter length is K.

K may be equal to 3.

A radio interface may be transmitted over non-adjacent sub-carriers.

The pulse shaping may be produced by combining a modulated data signal with a window function prior to transmission.

The window function may be a Hanning window function.

Data may be modulated onto sub-carriers using differential quadrature phase shift modulation.

Data may be modulated onto sub-carriers using binary phase shift keying.

According to a second aspect of the present invention, there is provided an OFDM receiver adapted to receive an OFDM signal in which side lobes are suppressed by pulse shaping, characterized in that the receiver includes an equalizer adapted to compensate for a loss of carrier orthogonality induced by pulse shaping.

According to a third aspect of the present invention, there is provided, in an OFDM system in which side lobes are suppressed by pulse shaping, the system including a transmitter and a receiver, a method of compensating for loss of orthogonality induced in a transmitted OFDM signal by pulse shaping characterized by equalizing a receive pulse shaped OFDM signal at said receiver.

The equalizing may be predictive equalizing.

The equalizing may be performed by a MLSE equalizer.

The equalization process may include the step of selecting an estimated data sequence $X_{est,k}$, such that the metrics $(Z_k - (X_{est,k} \otimes W_k))^2$ are minimized.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

To facilitate an understanding of the present invention, a glossary of some of the abbreviations used in this patent specification are set out below:

BPSK: Binary Phase Shift Keying.

DFT: Discrete Fourier Transform.

DQPSK: Differential Quadrature Phase Shift Keying.

FFT: Fast Fourier Transform.

IFFT: Inverse Fast Fourier Transform.

ISI: Inter Symbol Interference.

MLSE: A predictive equalizer in which the most probable data sequence is estimated by comparing an estimated data sequence which has been subjected to a similar distortion as the original data sequence with the original data sequence.

OFDM: Orthogonal Frequency Division Multiplex.

QPSK: Quadrature Phase Shift Keying.

SNR: Signal to Noise Ratio.

Figure 1:
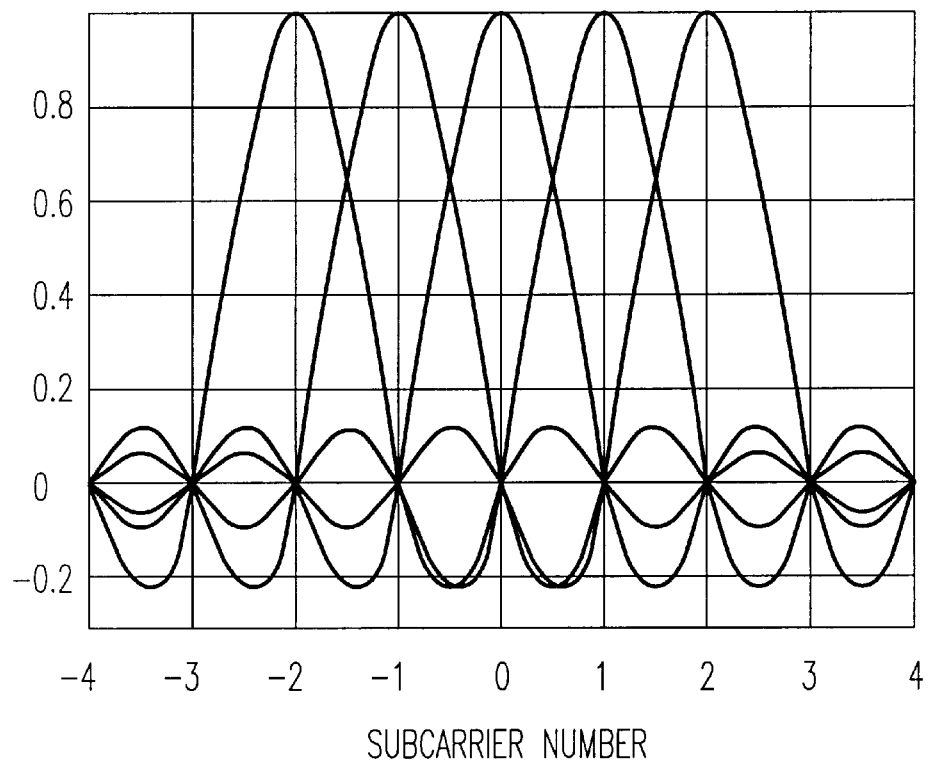
FIG. 1 shows the relationship between different sub-carriers in an OFDM system.

In OFDM, the fundamental part of the modulation/demodulation process is performed by means of a Discrete Fourier Transform (DFT). The DFT can be calculated using an efficient algorithm, such as the Fast Fourier Transform (FFT) algorithm. The fundamental properties of the transform introduces block processing, where the data is divided in successive blocks, which causes the sub-carriers to widen into Sinc-functions, (i.e. $F(x)=\sin(x)/x$), in the frequency plane. This is illustrated in FIG. 1. The sub-carrier maxima are located at the zero-crossings of adjacent sub-carriers. For this reason the system is said to be orthogonal.

The slow decay of the sub-carrier Sinc-function ($\sim 1/f$), requires the introduction of large guard bands in order to suppress interference with adjacent frequency bands.

Figure 2:
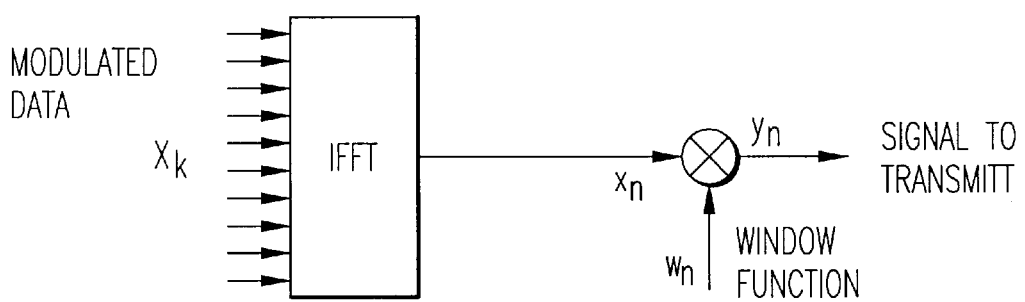
FIG. 2 illustrates, in schematic form, pulse shaping in an OFDM transmitter.

To reduce the guard bands, it has been proposed that, in an OFDM system, the signal should be shaped using an appropriate window function, such as a Hanning window, before transmission, see B. Engstrom, "A Class of OFDM Pulse Shapes", and M. Gudmundsson, "RF Considerations of OFDM Signals". The signal is multiplied with the window function as shown in FIG. 2. The incoming modulated data, $X_k$, is subjected to FFT processing to produce a signal $x_n$. This signal is then multiplied by a Hanning window function, $w_n$, to produce a signal $y_n$, which is transmitted. As explained later, the transmitted signal, $y_n$, has suppressed side lobes.

The Hanning window function is defined as:

$$w(n) = \begin{cases} 1 - \cos\left(\frac{2\pi n}{N}\right) & 0 \leq n < N-1 \\ w(n+pN) & p = \pm 1, \pm 2 \ldots \end{cases} \quad (1)$$

where n is the time index and N is the block size of the FFT.

In order to examine the effect of the window function on the data, the system is transformed into the frequency domain. The window function is cyclic with a periodicity of N, and its Fourier transform is written as:

$$W_k = \delta(k) - \frac{1}{2}\delta(k-1) - \frac{1}{2}\delta(k+1) \quad (2)$$

where $\delta(k)$ is the Kronecker delta function and k is the Fourier series coefficient (and sub-carrier number). The multiplication in the time domain is equivalent to a convolution in the frequency domain, and the signal, $Y_k$, is written as:

$$Y_k = X_k \otimes W_k = \sum_{l=0}^{N-1} X_{k-l} \cdot W_l = X_k - \frac{1}{2}X_{k-1} - \frac{1}{2}X_{k+1} \quad (3)$$

where the $\otimes$ symbol represents cyclic convolution.

Figure 3:
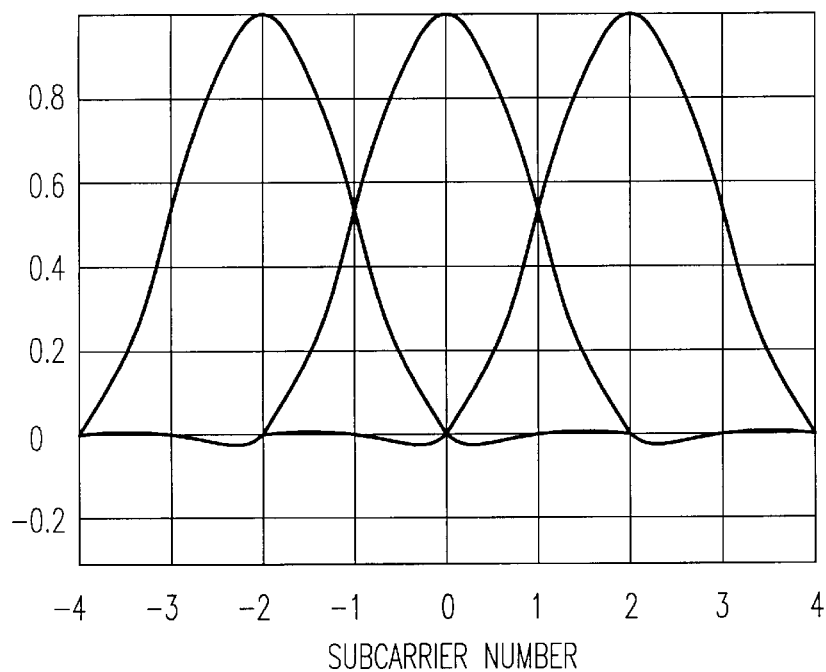
FIG. 3 shows the result of pulse shaping sub-carriers with a Hanning window.

This pulse shaping method results in the sub-carrier plot illustrated in FIG. 3. The pulse shape decays in proportion to 1/f. If can easily be seen from equation (3), and FIG. 3, that orthogonality is lost on every other sub-carrier and that the pulse shaping reduces the maximum available bit rate, on a single data link, by a factor two. This means that only alternate sub-carriers can be used for data transmission. The system capacity is not, however, reduced by the same amount, because significantly smaller guard bands can be used, see M. Gudmundsson and P. O. Anderson, First results on transmission studies.

Two important aspects of performance are the signal energy per sub-carrier, Eb/NO and Signal to Noise Ratio (SNR). The physical meaning of these parameters is complicated where pulse shaping is used, because, only half the data rate can be utilized for transmission, thus reducing data transfer by a factor two. On the other hand, half of the noise energy is also lost in the receiver. This means that performance is not degraded in terms of both a SNR and Eb/NO.

Because the sub-carrier is widened by the pulse shaping, there will be some loss of performance, since the terminal has a fixed output power. Pulse shaping does not necessarily change the energy of the signal. This implies a need for a normalization of the pulse shaping filter. The normalization factor can be calculated from the following equation:

$$\sum a^2 \cdot W_k^2 = 1 \quad (4)$$

where a is the normalization factor, and is given by:

$$a = \sqrt{\frac{1}{\sum W_k^2}} \quad (5)$$

Using $W_k$ from (2) gives:

$$a = \sqrt{\frac{2}{3}} \approx -0.88 \text{ dB} \quad (6)$$

This means that pulse shaping gives a performance loss of 0.88 dB, in an AWGN-channel $N_k$, additive white Gaussian noise, compared to the theoretical performance.

Figure 4:
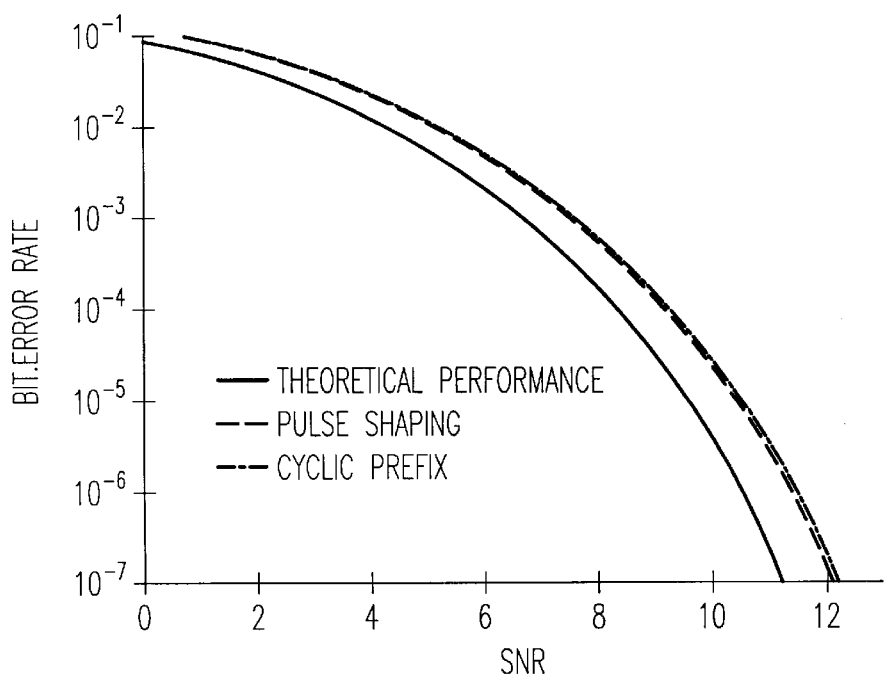
FIG. 4 shows a performance comparison in an OFDM system of cyclic prefix and pulse shaping.

If a cyclic prefix is used, the performance loss is proportional to the size of the cyclic prefix-symbol length ratio. This is because the cyclic prefix is removed and thrown away in the receiver as can be seen from the performance losses associated with the pulse shaping and cyclic prefix techniques on the BER vs. SNR graph of FIG. 4. If the cyclic prefix is, for example, 10% of the total symbol length, the performance loss is:

$$10 \cdot \log(1.10) \approx 0.95 \text{dB} \quad (7)$$

An important question is whether it is possible to transmit on all sub-carriers without loss in performance. Apparently, transmission on all sub-carriers will cause loss of orthogonality, but in a very controlled way from which it might be possible to recover.

Figure 5:
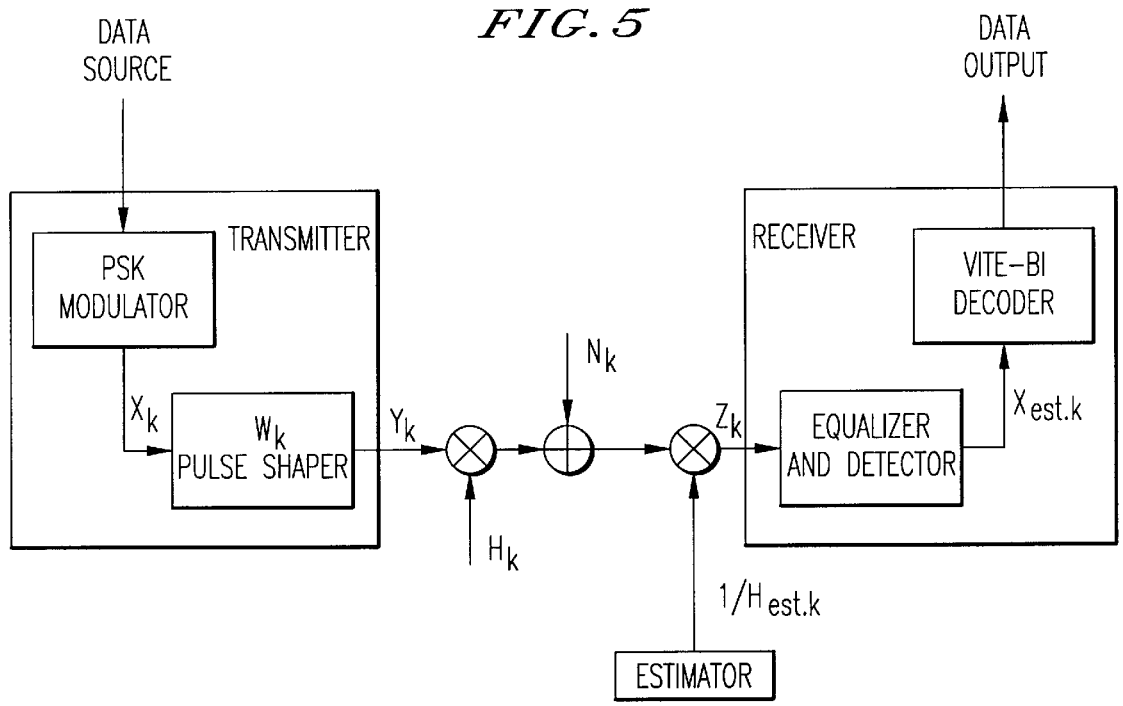
FIG. 5 illustrates, in schematic form, an OFDM system according to the present invention.

Examining equation (3), it can be seen that the pulse shaping of the signal $x_n$, can also be viewed as a time dispersive channel introducing inter symbol interference (ISI) on the same signal in the frequency domain $X_k$. Ordinary methods of combating ISI can, therefore, be used to correct for the loss of orthogonality introduced by pulse shaping. Note that the filter taps are static and known, which significantly reduces the problem. An equivalent model for the OFDM system, implemented in the frequency domain, is illustrated in FIG. 5. A data source feeds a PSK modulator with data and the PSK modulator outputs an OFDM modulated signal $X_k$ to a window operator that shapes the pulses. A receiver with a demodulator is also shown.

On the assumption that it is possible to equalize the channel, the detection problem is the same as in the time domain, except for the cyclic convolution H in the pulse shaping filter. The cyclic convolution is, however, a minor problem which can be avoided by building in the appropriate data $1/H_{est,k}$ from an estimator, relating to the cyclic convolution, into the decoder. Thus, a relatively minor and simple modification will allow transmission on all sub-carriers.

Several different approaches can be used for detection of the data sequence. One possible approach to the problem is to pre-distort data before the pulse shaping filter, or perform an inverse filtering in the receiver, so that the data will be correctly detected in the receiver. Unfortunately, both these methods regenerate the problems which pulse shaping is intended to solve, namely:

reduction of the guard bands; and suppression of ISI between OFDM-symbols.

It is much better to use predictive equalization to estimate the transmitted information in an intelligent manner. This can be done with a MLSE-equalizer.

A MLSE-equalizer chooses the most probable data sequence, by comparing the received data signal $Z_k$ (which is output by a cyclic convolution operator with a reference data signal which has been distorted in the same way as the received data. The optimum way of detecting the data is to choose the data sequence $X_{est,k}$, that minimizes the metrics:

$$\min(Z_k - X_{est,k} \otimes W_k))^2) \quad (8)$$

with the same signal names as in FIG. 5. If $X_k$ belongs to an M symbol alphabet and transmission is on N sub-carriers, $M^N$ metrics must be calculated in order to find the most probable data sequence. Knowing that N is a large number (1024 in the OFDM system used in the present invention), the direct calculations cannot be performed. The Viterbi algorithm is, however, a computationally efficient method, optimized for this kind of problem. With the Viterbi decoder, the necessary calculations are reduced to $N.M^{K-1}$ where K is the filter length (in the case of the present invention K=3).

The ISI introduced by the pulse shaping window, will degrade the performance on the data transmission. There is, however, a trade-off between the performance loss in SNR against the gain in transmission rate. The strong connections between the sub-carriers implies that the errors will be bursty, thus if there is an error on one sub-carrier, it is likely that the surrounding sub-carriers will also be corrupted. This is important to remember when designing the whole system. In order to be able to correct errors for a specific service, the radio interface should, if possible, use non-adjacent sub-carriers.

The expected performance of a MLSE equalizer is evaluated in "Digital Communications" by J. G. Proakis, Published McGraw Hill 1989 (the contents of which is incorporated herein by reference). Following the calculations in section 6.7.1, on page 616, of this reference, define:

$$F(z) = f_{-1} \cdot z^{-1} + f_0 + f_1 \cdot z^1 \quad (9)$$

which is a time dispersive channel. Next assume some symbol errors of length 2n−1 and define the error polynomial:

$$\epsilon(z) = \sum_{k=-(n-1)}^{n-1} \epsilon_k z^k \quad (10)$$

The only thing that it is necessary to know about the errors is that the first and last terms in the sum are not equal to zero. The polynomial can now be defined as:

$$\alpha(z) = F(z) \cdot \epsilon(z) \quad (11)$$

and $$\delta^2 = \sum_i \alpha_i^2 \quad (12)$$

where $a_i$ is the coefficients of the α-polynomial. It can be shown that the minimum value of $\delta^2$ represents the upper bound of the performance loss due to ISI ("Digital Communications" by J. G. Proakis, Published McGraw Hill 1989 pp. 621). The minimum value of $\delta^2$ corresponds to the occurrence of as few error as possible. It is, therefore, possible to rewrite equation (10) as:

$$\epsilon(z) = \epsilon_{-\beta} \cdot z^{-\beta} + \epsilon_\beta \cdot z^\beta \quad (13)$$

where β=n−1. Equation (11) can now be rewritten as:

$$\alpha(z) = F(z) \cdot \epsilon(z) = (f_{-1} \cdot z^{-1} + f_0 + f_1 \cdot z^1)(\epsilon_{-\beta} \cdot z^{-\beta} + \epsilon_\beta \cdot z^\beta) \quad (14)$$

The minimum value of δ can now be evaluated. $\delta^2_{mim}$ is bounded by the smallest and highest degree coefficients in the α-polynomial. This is because they only appear once and do not interact with any other terms. $\delta^2_{min}$ is written as:

$$\delta^2_{min} = (f-1 \cdot \epsilon_{-\beta})^2 + (f_1 \cdot \epsilon_\beta)^2 = (-\frac{1}{2})^2 + (-\frac{1}{2})^2 = \frac{1}{2} = -3 \text{ dB} \quad (15)$$

The upper bound of the performance loss is 3 dB. Knowing that the calculated upper bound is the worst possible case it might, therefore, be expected that there will be no severe performance losses compared to the 0.88 dB loss calculated above.

In order to verify the calculations set out above, a simulation model was built. The simulation used BPSK-modulation. In practice, a system would use a higher modulation form such as (DQPSK). Therefore, the results of the simulation cannot be mapped to a practical system.

Figure 6:
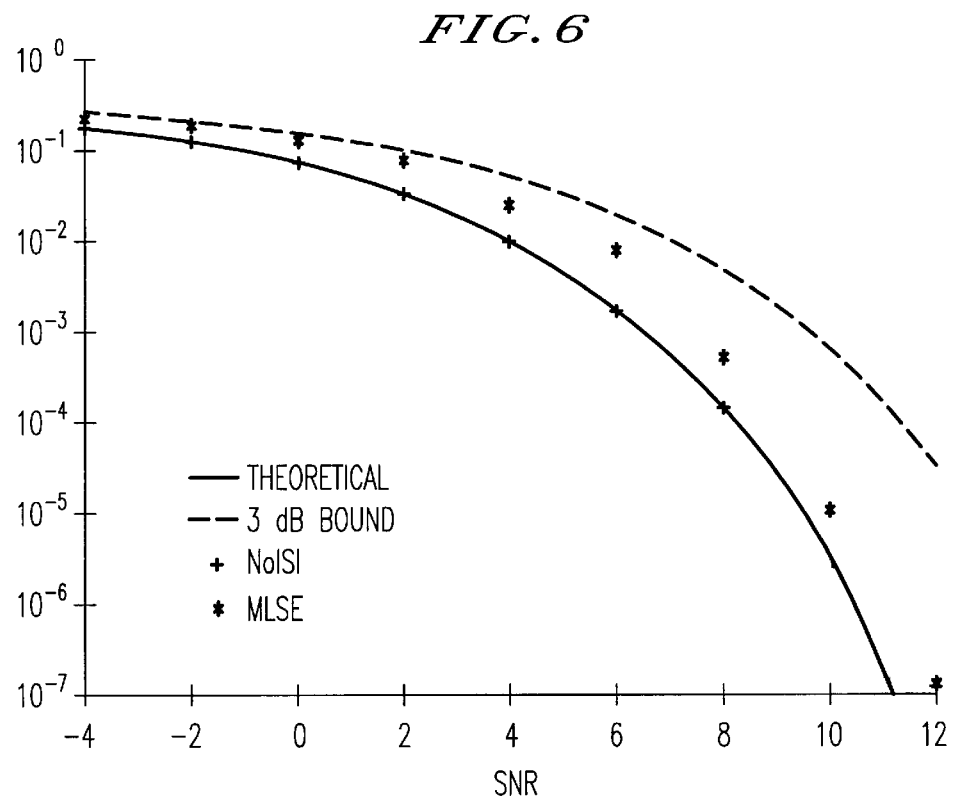
FIG. 6 illustrates the performance advantages of the present invention.

FIG. 6 shows that for a bit error rate of $10^{-3}$, the loss is approximately 1 dB, which seems to be a negligible amount compared to the gain in transmission rate. For lower bit error rates (such as $10^{-6}$) the performance loss is even smaller.

The performance for all SNR-values is under the 3 dB bound, as expected. The largest performance loss is almost 3 dB, for a bit error rate of $\sim 10^{-1}$, which is in a non-usable area for data transmission.

The present invention describes a method for transmitting data on all sub-carriers in an OFDM system when the side lobes are suppressed with a Hanning window. The method is based on the concept of controlling Inter Symbol Interference by using a MLSE-equalizer in the receiver. The calculations and simulations show a small performance loss for BPSK, which seems to be negligible. For lower bit error rates the performance loss is even smaller.

What is claimed as new and is desired to be secured by Letters Patent of the United States is:

1. An OFDM system comprising:

a transmitter configured to transmit an orthogonal frequency division multiplexing (OFDM) signal in which side lobes of said signal are suppressed by a pulse shaping operation performed by a pulse shaping mechanism on said signal, said pulse shaping operation causing a loss of carrier orthogonality; and a receiver configured to receive said signal, said receiver comprising an equalizer configured to compensate for said loss of orthogonality.

2. The OFDM system as claimed in claim 1, wherein said equalizer comprises a predictive equalizer.

3. The OFDM system as claimed in claim 2, wherein said equalizer comprises a maximum likelihood sequence estimator (MLSE) equalizer.

4. The OFDM system as claimed in claim 2, wherein said receiver comprises an estimation mechanism configured to select a estimated sequence $X_{est,k}$, such that metrics $(Z_k-(X_{est,k}\otimes W_k))^2$ are minimized, wherein $\otimes$ is a cyclic convolution operator, $Z_k$ is a signal output by said cyclic convolution operator and $W_k$ is a Fourier transform of a windowing function that is applied to said signal.

5. The OFDM system as claimed in claim 4, wherein said receiver comprises a Viterbi decoder and said Viterbi decoder is configured to calculate said metrics using a process that implements a Viterbi algorithm.

6. The OFDM system as claimed in claim 5, wherein said Viterbi decoder calculates a total of $N \cdot M^{K-1}$ metrics, where $X_k$ belongs to a M symbol alphabet, and said transmitter is configured to transmit N sub-carriers and a filter length has K stages.

7. The OFDM system as claimed in claim 6, wherein said filter length has three stages such that K=3.

8. The OFDM system as claimed in claim 1, wherein said transmitter is configured to transmit a radio interface over non-adjacent sub-carriers.

9. The OFDM system as claimed in claim 1, wherein said pulse shaping mechanism of said transmitter includes a combiner that is configured to perform said pulse shaping operation by combining a modulated data signal with a window function prior to transmission.

10. The OFDM system as claimed in claim 9, wherein in that said window function comprises a Hanning window function.

11. The OFDM system as claimed in claim 1, wherein said signal comprises data that is modulated onto sub-carriers using differential quadrature phase shift modulation, and said receiver having a demodulator that demodulates the data from the sub-carriers.

12. The OFDM system as claimed in claim 1, wherein said signal comprises data that is modulated onto sub-carriers using binary phase shift keying, and said receiver having a demodulator that demodulates the data from the sub-carriers.

13. An OFDM receiver adapted to receive an OFDM signal in which side lobes of said signal are suppressed by pulse shaping, comprising:

a receiver mechanism configured to receive said OFDM signal transmitted from a transmitter; and an equalizer adapted to compensate for a loss of carrier orthogonality induced by said pulse shaping.

14. The OFDM receiver as claimed in claim 13, wherein said equalizer comprises a predictive equalizer.

15. The OFDM receiver as claimed in claim 14, wherein said equalizer comprises a MLSE equalizer.

16. The OFDM receiver as claimed in claim 14, wherein said receiver comprises an estimation mechanism configured to select an estimated sequence $X_{est,k}$, such that metrics $(Z_k-(X_{est,k}\otimes W_k))^2$ are minimized, wherein $\otimes$ is a cyclic convolution operator, $Z_k$ is a signal output by said cyclic convolution operator and $W_k$ is a Fourier transform of a windowing function that is applied to said signal.

17. The OFDM reciever as claimed in claim 16, wherein said receiver comprises a Viterbi decoder and said Viterbi decoder calculates said metrics using a Viterbi algorithm.

18. The OFDM reciever as claimed in claim 17 wherein said Viterbi decoder calculates a total of $N \cdot M^{K-1}$ metrics, where $X_k$ belongs to a M symbol alphabet, and said transmitter is configured to transmit N sub-carriers and a filter length of a filter has K stages.

19. The OFDM receiver as claimed in claim 18, wherein said filter has three stages such that K=3.

20. A method for communicating an OFDM signal, comprising the steps of:

forming at a transmitter said OFDM signal;

pulse shaping said signal so as to reduce side lobes of said signal;

transmitting said signal;

receiving said signal at a receiver; and applying at said receiver said signal to an equalizer, comprising compensating for a loss of orthogonality of said signal.

21. The method of claim 20, wherein said applying step comprises applying said signal to a prediction equalizer.

22. The method of claim 21, wherein said applying step comprises applying said signal to a MLSE equalizer.

23. The method of claim 21, wherein said compensating step comprises the step of selecting an estimated data sequence $X_{est,k}$, such that the metrics $(Z_k-(X_{est,k}\otimes W_k))^2$ are minimized, wherein $\otimes$ is a cyclic convolution operator, $Z_k$ is a signal output by said cyclic convolution operator and $W_k$ is a Fourier transform of a windowing function that is applied to said signal.

24. The method of claim 23, further comprising the step of calculating said metrics by means of a Viterbi algorithm implemented in a Viterbi decoder.

25. The method of claim 24, wherein said calculating step comprises calculating a total of $N \cdot M^{K-1}$ metrics, where $X_k$ belongs to a M symbol alphabet, said N is a number of sub-carriers for said OFDM signal and K represents a number of stages in a filter.

26. The method of claim 25, wherein said calculating step comprises calculating said total metrics based on said number of stages in said filter being three, such that K=3.

27. The method of claim 20, further comprising the step of transmitting a radio interface over non-adjacent sub-carriers.

28. The method of claim 20, wherein said pulse shaping step comprises combining a modulated data signal with a window function prior to transmission.

29. The method of claim 28, wherein said combining step comprises combining said modulated data signal with a Hanning window function.

30. The method of claim 20, further comprising modulating data onto sub-carriers using differential quadrature phase shift modulation, and demodulating the data from the sub-carriers.

31. The method of claim 20, further comprising modulating data onto sub-carriers using binary phase shift keying, and demodulating the data from the sub-carriers.

* * * * *